United States Patent [19]

Oklejas et al.

[11] Patent Number: 5,049,045
[45] Date of Patent: Sep. 17, 1991

[54] POWER RECOVERY TURBINE PUMP

[76] Inventors: Robert A. Oklejas, 774 E. Hurd Rd.; Eli Oklejas, Jr., 136 Bur Oak Ct., both of Monroe, Mich. 48161

[21] Appl. No.: 622,358

[22] Filed: Dec. 4, 1990

Related U.S. Application Data

[63] Continuation of Ser. No. 160,679, Feb. 26, 1988, abandoned.

[51] Int. Cl.$^5$ ..................... F04B 17/00; F04B 35/00
[52] U.S. Cl. .......................................... 417/365; 417/406
[58] Field of Search ................ 417/405, 406, 407, 365

[56] References Cited

U.S. PATENT DOCUMENTS

| | | | |
|---|---|---|---|
| 1,609,306 | 12/1926 | Peterson | 417/365 |
| 2,710,579 | 6/1955 | Kriegbaum | 417/365 |
| 2,809,590 | 10/1957 | Brown | 417/365 |
| 4,029,438 | 6/1977 | Sloan | 417/200 |
| 4,077,220 | 3/1978 | Matthews | 417/405 |
| 4,208,166 | 6/1980 | Schroeder et al. | 415/172.1 |
| 4,227,865 | 10/1980 | Erickson et al. | 417/365 |
| 4,264,285 | 4/1981 | Erickson et al. | 417/405 |

Primary Examiner—Louis J. Casaregola
Assistant Examiner—Timothy S. Thorpe
Attorney, Agent, or Firm—Emch, Schaffer, Schaub & Porcello Co.

[57] ABSTRACT

The invention is directed to an energy recovery pump turbine for use in industrial processes where a fluid is pumped at a high pressure to the process and at least a portion of the fluid is discharged from the process at a high pressure. A turbine is positioned to receive the high pressure discharge from the process. The turbine has an impeller positioned on a shaft and the discharged fluid engages the impeller and causes the impeller and shaft to rotate. A pump is position adjacent to the turbine to receive the fluid being pumped to the process. The pump has an impeller mounted on a shaft and the shaft of the pump is operatively connected to the shaft of the turbine. Rotation of the turbine shaft causes the impeller and the shaft of the pump to rotate whereby the pump assists in supplying the fluid under pressure to the process and to recover energy from the high pressure fluid discharged from the process.

Also disclosed is a method for recovering energy from an industrial process where a fluid is pumped at a high pressure into the process and at least a portion of the fluid is discharged from the process at a high pressure. The high pressure discharged fluid is directed into the inlet of a turbine. The inlet of the turbine is caused to rotate by the high pressure discharged fluid. The turbine impeller is mounted on a rotatable shaft. An impeller of a pump that is mounted on the shaft is caused to rotate by the rotation of the shaft that is caused by the rotation of the turbine impeller. The fluid that is to be pumped to the process is directed to the inlet of the pump. The rotating impeller of the pump raises the pressure of the fluid supplied under high pressure to the process and recovers energy from the high pressure fluid discharged from the process.

30 Claims, 6 Drawing Sheets

POWER RECOVERY TURBINE PUMP

This is a continuation of copending application Ser. No. 160,679 filed on Feb. 26, 1985 now abandoned.

BACKGROUND OF THE INVENTION

The invention relates to a new and useful power recovery pump turbine to reduce the energy requirements of many industrial and liquid purification processes that involve pumping liquid or gases at high pressures. This invention is particularly well-suited for use in reverse osmosis processes which are used to remove salt from sea water. In the reverse osmosis system and other systems in which the invention is particularly well-suited for use a liquid or gas is pumped at high pressure into a chamber. In the chamber a portion of the liquid or gas is purified or otherwise processed and drawn from the chamber. The remainder of the high pressure gas or liquid is discharged from the chamber as reject that is disposed. The reject is usually at a very high pressure and this pressure must be dissipated through the use of a throttling valve or other device. Usually the throttling valve reduces the pressure in the reject stream to essentially 0 psi so that all of the pressure energy in the reject stream is dissipated and provides no further benefit to the process. These energy losses can be very significant and result in a basic inefficiency in the system. In the use of reverse osmosis methods to remove salt from sea water these high energy costs associated with such an inefficient system have severely limited the commercial applications of the technology.

Several methods have been tried to recover the energy in the reject stream in order to reduce the operating costs of industrial or liquid purification processes. With regard to reverse osmosis systems, pistons with mechanically actuated valves that are positioned in devices resembling steam piston engines have been used. However, these devices have found no commercial acceptance due to the high cost and high maintenance required due to the mechanically complexed designs of the system. Furthermore, these systems produce strong shockwaves in the feed flow called water hammer, each time a valve opens or closes resulting in possible damage to components of the reverse osmosis system.

Other systems have used a turbine driven by the high pressure reject that is discharged from the system. The turbine is connected to the motor operating the feed pump. For good efficiency, a turbine must operate at very high speeds, usually exceeding 15,000 rpm. This high speed means that a reducing gear box must be installed between the turbine unit and the feed pump motor to effectively transfer the power from the turbine to the feed pump motor. The reducing gear box is a very expensive piece of equipment and requires a great deal of skill to install and maintain properly. A gear box also requires external means of lubrication further increasing the maintenance costs. It is also possible that the lubrication can contaminate the water that is fed to the reverse osmosis system. High speed seals must also be provided on the shaft between the turbine and the speed reducing gear box. These high speed seals are also expensive and usually not very reliable in field applications. For the above reasons there has been very little commercial acceptance of this type of power recovery system for use in reverse osmosis processes.

SUMMARY OF THE INVENTION

The invention is directed to an energy recovery pump turbine for use in industrial processes where a fluid is pumped at a high pressure into the process and at least a portion of the liquid is discharged from the process at a high pressure. A turbine is positioned to receive the high pressure discharge from the process. The turbine has an impeller positioned on a shaft and the discharged fluid engages the impeller and causes the impeller and shaft to rotate. A pump is positioned adjacent to the turbine to receive fluid being pumped to the process. The pump has an impeller mounted on a shaft and the shaft of the pump is operatively connected to the shaft of the turbine. Rotation of the turbine shaft causes the impeller and the shaft of the pump to rotate whereby the pump assists in supplying the fluid under pressure to the process and to recover energy from the high pressure fluid discharged from the process.

Also disclosed is a method for recovering energy from an industrial process where a fluid is pumped at a high pressure into the process and at least a portion of the fluid is discharged from the process at a high pressure. The high pressure discharged fluid is directed into the inlet of a turbine. The inlet of the turbine is caused to rotate by the high pressure discharged fluid. The turbine impeller is mounted on a rotatable shaft. An impeller of a pump that is mounted on the shaft is caused to rotate by the rotation of the shaft that is caused by the rotation of the turbine impeller. The fluid that is to be pumped to the process is directed to the inlet of the pump. The rotating impeller of the pump raises the pressure of the fluid supplied under high pressure to the process and recovers energy from the high pressure fluid discharged from the process.

It is an object of the invention to provide energy recovery pump turbine to utilize waste energy and industrial processes.

It is a further object of the invention to provide a turbine that is rotated by the high pressure discharge from an industrial process where the rotation of the turbine causes the impeller of a pump to rotate to assist in supplying liquid at a high pressure to the industrial process.

These and other objects of the invention will be more fully understood by reading the following detailed description of the invention in combination with the attached drawings.

DESCRIPTION OF THE PREFERRED EMBODIMENT

The invention is directed to a power recovery pump turbine that can be utilized to reduce the energy requirements of many industrial and liquid purification processes that involve pumping liquid or gases at high pressures. More particularly, the power recovery pump turbine recovers energy from the high pressure liquid or gas that is discharged from the purification process and uses this energy to pump the liquid or gas at high pressure into the purification process. The features of the invention will be more readily understood by referring to the attached drawings in connection with the following description.

The power recovery pump turbine of the present invention is particularly well-suited for use in a process to remove salt from sea water, called a reverse osmosis process. Accordingly, the invention will be described using the reverse osmosis process as the system where the power recovery pump turbine is utilized. It should be understood, however, that the power recovery pump turbine of the present invention can be used to reduce the energy requirements of many industrial and liquid purification processes that involve pumping liquid or gases at high pressures.

Figure 1:
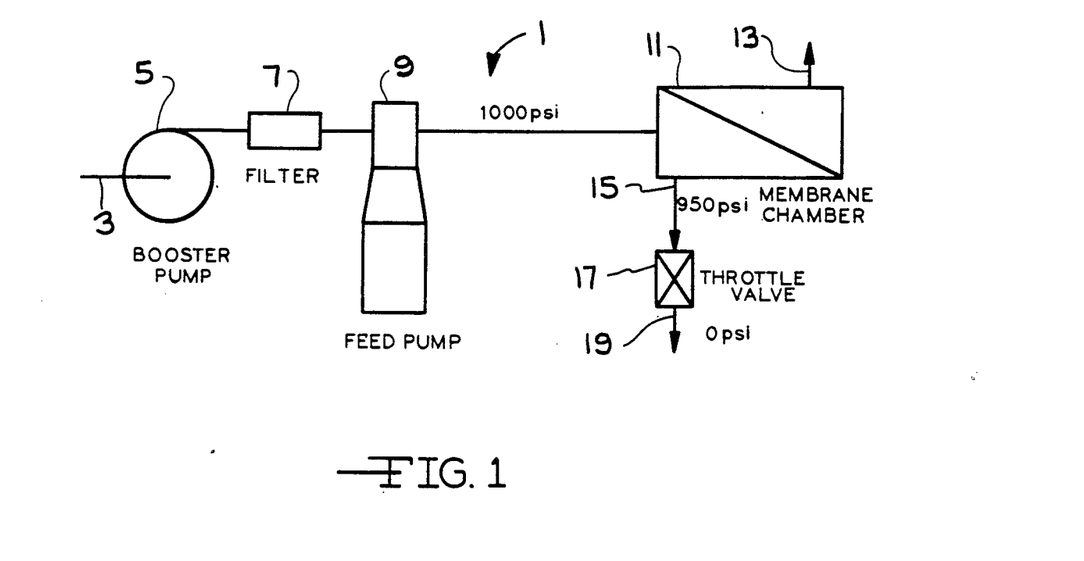
FIG. 1 is a schematic view of a prior art system to purify a liquid.

To better understand the environment in which the power recover pump turbine can be utilized, it is necessary to describe how a typical reverse osmosis system to remove salt from sea water operates. FIG. 1 shows a typical reverse osmosis system 1 where saltwater passes through an inlet pipe 3 into a booster pump 5. The booster pump increases the pressure of the saltwater to about 25 pounds per square inch and pumps the saltwater through a filter 7 where suspended impurities in the saltwater can be removed. From the filter 7 the saltwater passes into feed pump 9 where the pressure of the saltwater is increased to about 1000 psi. The high pressure (1000 psi) saltwater is then directed into a membrane chamber 11 where salt is removed from at least a portion of the sea water. As an example, if 100 gallons per minute of saltwater is supplied to the membrane chamber 11, approximately 25 gallons per minute of purified water will be produced by the membrane chamber. The purified water is discharged from the membrane chamber at a low pressure through the fresh water discharge line 13. Approximately 75 gallons per minute of concentrated saltwater brine is discharged from the membrane chamber through the brine discharge line 15. The concentrated brine is discharged from the chamber at about 950 psi and this concentrated brine is called the reject. The high pressure reject passes through a throttle valve 17 where the pressure of the concentrated brine reject is reduced so that the reject can be discharged through a waste line 19 for disposal. The pressure of the reject discharged through the waste line 19 is essentially 0 psi. The throttle valve 17 also acts to maintain pressure in the brine discharge line 15 to maintain the proper pressure in the membrane chamber to allow at least a portion of the saltwater to be purified.

In the example cited above for a reverse osmosis purification system the throttle valve lowers the pressure of the concentrated brine reject stream by approximately 950 psi. At a flow rate of 75 gallons per minute for the reject, the hydraulic power dissipated by the throttle valve is about 42 horsepower. This is a great deal of energy that must be put into the system by the feed pump 9 and this energy is effectively lost from the system as the energy is dissipated by the throttle valve 17.

Figure 2:
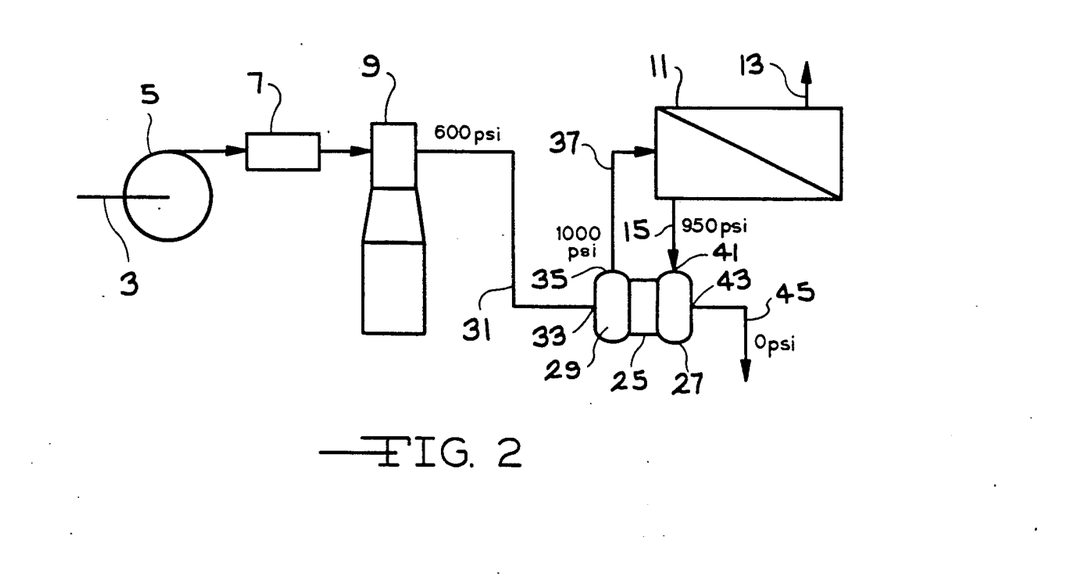
FIG. 2 is a schematic view of the power recovery pump turbine of the present invention used in a system.

FIG. 2 shows a reverse osmosis system where a power recovery pump turbine has been installed in the system. This system has essentially the same components as the previously described reverse osmosis system shown in FIG. 1 with the exception that a power recovery pump turbine 25 is operatively connected between the feed pump 9 and the membrane chamber 11 and the power recovery pump turbine is operatively connected to the brine discharge line 15 from the membrane chamber 11. The power recovery pump turbine has a turbine end 27 and a pump end 29. The pipe 31 from the feed pump 9 is connected to the pump inlet 33 on the pump end 29. The sea water passes through the pump inlet 33 through the pump end 29 and is discharged from the pump discharge 35. From the pump discharge 35 the sea water passes through pipe 37 into the membrane chamber 11. The portion of the sea water that is purified by the membrane chamber 11 passes from the chamber through discharge line 13. The concentrated brine reject passes from the membrane chamber 11 through brine discharge line 15. Brine discharge line 15 is operatively connected to the turbine inlet nozzle 41 on the turbine end 27 of the power recovery pump turbine 25. The concentrated reject passes through the turbine end 27 and is discharged from the turbine exhaust passage 43. From the turbine exhaust passage 43 the concentrated brine reject passes through waste line 45 and is disposed.

FIGS. 5-9 show the details of the power recovery pump turbine 25. The power recovery pump turbine unit has a central body portion or center body 49, a pump end cap 51, and turbine end cap 53 and a rotor 55. The center body 49 and pump end cap 51 define pump impeller cavity 88 and the center body 49 and turbine end cap 53 define turbine impeller cavity 83. The rotor 55 consists of a pump impeller 57, turbine impeller 59 and a rotor shaft 61. The pump impeller 57 and the trubine impeller 59 are operatively connected to the rotor shaft 61. The pump impeller 57 is disposed to be located in the pump impeller cavity 88 and the turbine impeller 59 is disposed to be located in the turbine impeller cavity 83. The rotor shaft 61 is supported in the radial direction by a sleeve bearing 63. The rotor shaft 61 does not extend beyond the power recovery pump turbine thereby eliminating the need for external shaft seals.

Figure 5:
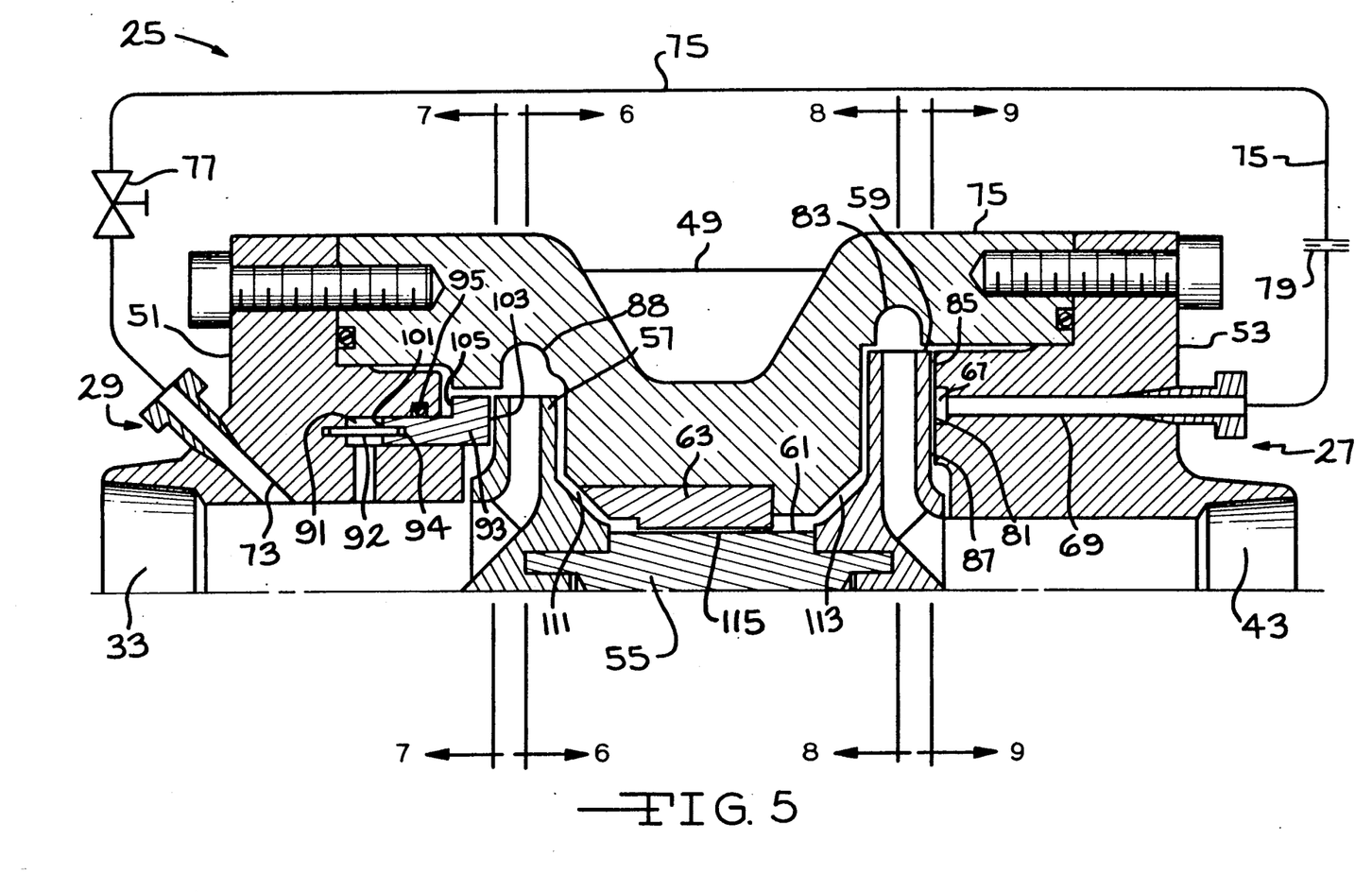
FIG. 5 is a partial cross-sectional view of the power recovery pump turbine.
Figures 6, 7:
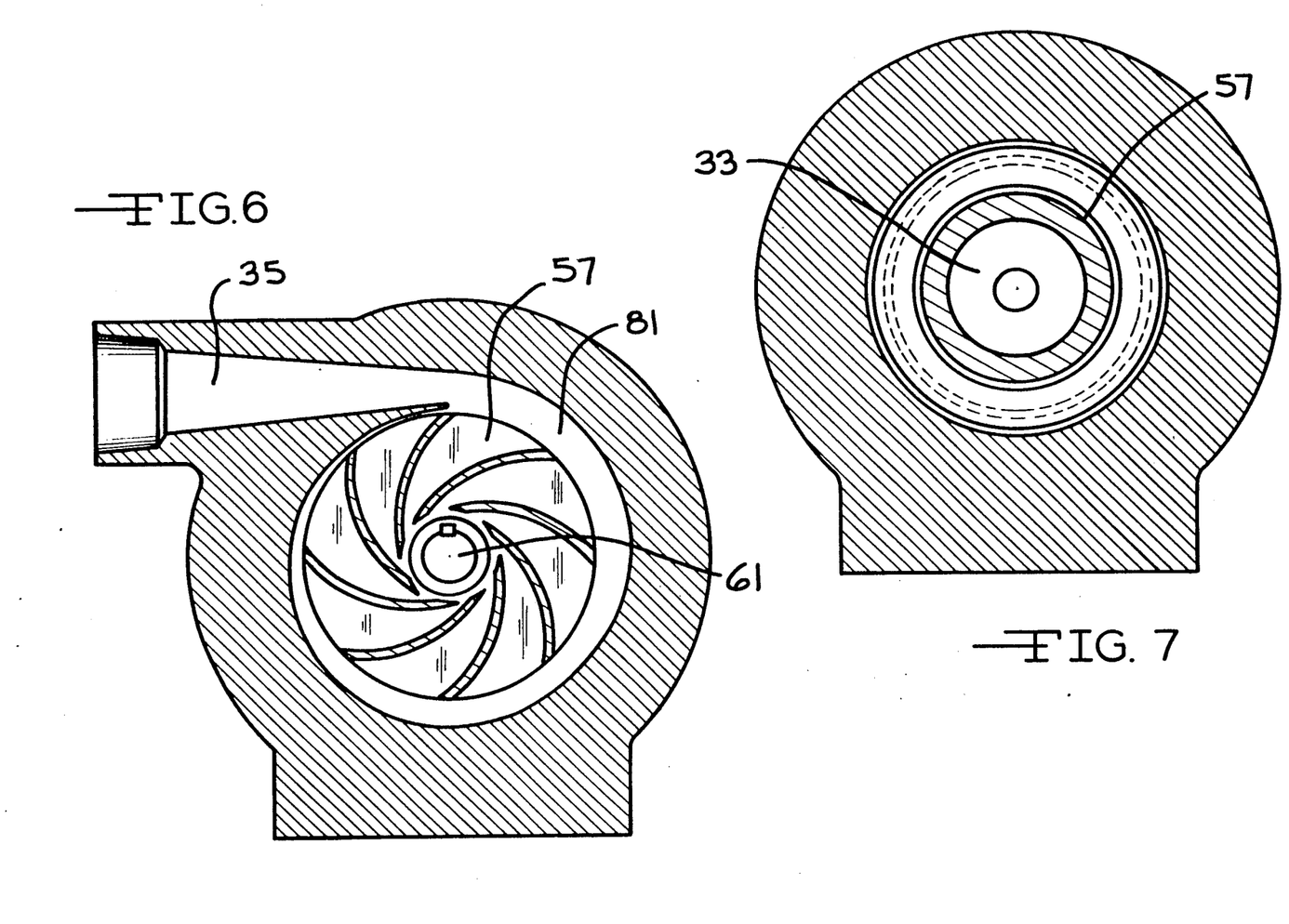
FIG. 6 is a cross-sectional view taken along line 6—6 in FIG. 5.
FIG. 7 is a cross-sectional view taken along line 7—7 in FIG. 5.
Figures 8, 9:
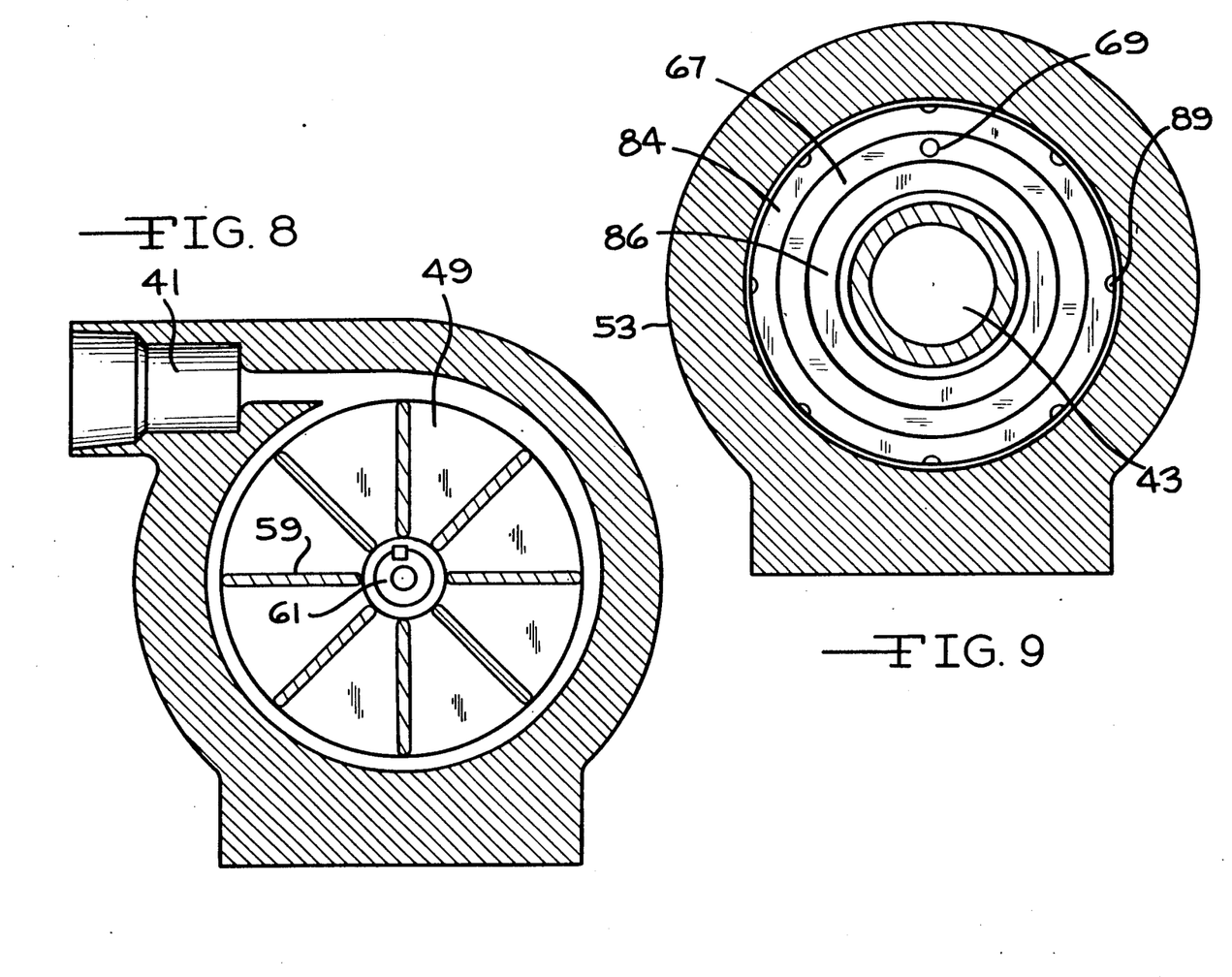
FIG. 8 is a cross-sectional view taken along line 8—8 in FIG. 5.
FIG. 9 is a cross-sectional view taken along line 9—9 in FIG. 5.

The inlet for the turbine end 27 of the power recovery pump turbine 25 is through turbine inlet nozzle 41 shown in FIG. 8. The turbine inlet nozzle 41 is connected to the brine discharge line 15 from the membrane chamber 11. The turbine exhaust passage 43 as shown in FIGS. 5 and 9 connects to waste discharge line 45. On the pump end 29 of the power recovery pump turbine 25 the pump inlet 33, shown in FIGS. 5 and 7, is connected to feed pipe 31 from the feed pump 9. The pump discharge passage 35 shown in FIG. 6 is connected to a pipe 37 that leads to the membrane chamber 11.

A groove 67 is located in the tubine end cap 53 and forms an annular ring in the turbine end cap. The groove is in communication with the turbine impeller cavity 83 where the turbine impeller 59 is located. A passageway 69 passes through the turbine end cap 53 and is in communication with the groove 67. A channel or passageway 73 passes through the pump end cap 51 and is in communication with the pump inlet 33. A conduit 75 extends between and connects the passageway 69 in the turbine end cap 53 with the passageway 73 in the pump end cap 51. A valve 77 is positioned in the conduit 75 adjacent to the pump end cap 51. An orifice plate 79 is positioned in the conduit 75 adjacent to the turbine end cap 53. The orifice plate 79 has a plurality of orifices located therein to regulate the flow of fluid through the conduit 75. The orifice plate prevents quick changes in the rate of fluid flow through the conduit 75. An axial clearance 81 extends between the outer periphery of the turbine impeller 59 and the turbine end cap 53. The axial clearance has an outer axial clearance 85 that is located on the side of the groove 67 that is spaced apart from the rotor shaft 61 and an inner axial clearance 87 that is located on the side of the groove 67 that is adjacent to the rotor shaft 61. The groove 67 is in communication with the axial clearance 81. The cross-sectional area of the annular ring formed by the groove 67 is from about 1.5 to about 2.5 times the cross-sectional area of the rotor shaft 61. In practice it has been found that the groove 67 functions well if its cross-sectional area is about 2 times the cross-sectional area of the rotor shaft 61.

Shown in FIG. 9 there is an outer seal surface 84 and an inner seal surface 86 located in the turbine end cap 53. The outer and inner seal surfaces are positioned adjacent the outer axial clearance 85 and inner axial clearance 87, respectively. Shallow grooves 89 extend radially from one side of the outer sealing surface 84 but not all the way across the outer sealing surface. The shallow grooves 89 form a hydrodynamic thrust bearing on the outer sealing surface. It should be understood that the shallow grooves could alternatively be position on the inner seal surface 86 to form a hydrodynamic thrust bearing. The portion of the outer sealing surface that contains the shallow grooves 89 produces fluid film hydrodynamic lift during rotation of the turbine impeller 59. The other portion of the outer sealing surface 84 provides a seal between the high pressure fluid in the groove 67 and the regions of lower pressure at the turbine exhaust passage 43 and the outer periphery of the turbine impeller 59. Once the turbine impeller 59 has achieved sufficient operating speed to generate hydrodynamic lift, the flow of fluid through the conduit 75 can be shut off by the valve 77. In this configuration the sealing surface contains both the hydrodynamic thrust bearing and a plain sealing area needed to reduce leakage between zones of different pressure.

The radial width of the inner seal surface 86 should be greater than the radial width of the outer seal surface 84 due to the higher pressure differential between the groove 67 and the turbine exhaust passage 43 than between the groove 67 and the turbine inlet 41. The inner and outer sealing surfaces may be separately attached to the turbine end cap 53 and can be made from the same or different material than the turbine impeller 59.

As shown in FIG. 5, on the pump end 29 of the power recovery pump turbine 25 there is a pump impeller cavity 88 and the pump impeller 57 is positioned in this cavity. In the pump end cap 51 there is a seal cavity 91. A wear ring 93 is slideably positioned in the seal cavity 91. The wear ring is positioned so that it extends part way into the seal cavity 91. O-rings 95 are positioned adjacent the portion of the wear ring 93 that extends into the seal cavity 91 to provide a seal around the wear ring 93. A portion of the wear ring 93 extends from the seal cavity 91 and extends towards the pump impeller 57. This portion of the wear ring 93 has an increased cross-sectional area that acts as a stop to limit the movement of the wear ring in the seal cavity 91 in a direction away from the pump impeller 57. A bore or passageway 97 extends from the seal cavity 91 to the pump inlet passageway 33. The portion of the wear ring 93 that extends into the seal cavity 91 terminates in a face 101. The end of the wear ring 93 that extends from the seal cavity 91 terminates in a seal face 103 that is adjacent to the pump impeller 57. The area of face 101 is approximately 0.4 of the area of the seal face 103. The wear ring 93 also has a shoulder 104 that forms a step face 105 that faces the pump end cap 51. The area of the step face 105 is approximately 0.6 of the area of the seal face 103. Seal face 103 is positioned so that it is substantially parallel to the side of the pump impeller 57. Face 101 and step face 105 are disposed so that they are substantially parallel to seal face 103. The wear ring 93 is positioned so that it is free to move axially in the seal cavity 91. A pin 92 extends from the pump end cap 51 into the seal cavity 91 and into a cavity 94 in the wear ring 93. The pin 92 prevents the wear ring 93 from rotating but does not prevent axial movement of the wear ring in the seal cavity 91.

Positioned between the pump impeller 57 and turbine impeller 59 is sleeve bearing 63. There is a chamber 111 that is positioned between the sleeve bearing 63 and the pump impeller 57. The chamber 111 is in communication with the pump impeller cavity 88. On the opposite side of the sleeve bearing 63 there is an annular space 113 that connects to the turbine impeller cavity 83. The sleeve bearing 63 is disposed around the rotor shaft 61 so that there is small seal clearance 115 between the rotor shaft 61 and the sleeve bearing 63. The seal clearance 115 provides a path of communication between the chamber 111 and the annular space 113.

In operation of the power recovery pump turbine 25, saltwater from the feed pump 9 enters the pump inlet 33 passes through the pump end 29 of the power recovery pump turbine and is directed to the membrane chamber 11. The salt brine reject stream from the membrane chamber 11 passes through brine discharge line 15 into the turbine inlet nozzle 41. The brine passes through the turbine end 27 and is discharged through the turbine exhaust passage 43. The turbine inlet nozzle 41 converts the high pressure brine reject flow into a high velocity flow. The high velocity flow brine enters the turbine impeller cavity 83 and causes the turbine impeller 59 to rotate. As the turbine impeller 59 is mounted on rotor shaft 61 and the pump impeller 57 is also mounted on the rotor shaft 61 the rotation of the turbine impeller causes the pump impeller to rotate. The rotating pump impeller 57 draws saltwater from the feed pump into the pump inlet 33. The saltwater passes into the pump impeller cavity 88 and the rotating pump impeller 57 raises the pressure of the saltwater. The saltwater is then directed out through the pump discharge 35 and is directed to the membrane chamber 11. In this manner the energy in the high pressure discharge from the membrane chamber 11 can be utilized to assist in pumping saltwater into the membrane chamber. As an example, once the system is running the feed pump 9 can deliver saltwater at approximately 600 psi to the power recovery pump turbine 25. The 950 psi concentrated brine reject is utilized to rotate the turbine impeller 59 which rotates the pump impeller 57 so that the saltwater entering the pump inlet 33 can be boosted from 600 psi as it enters the pump inlet to 1000 psi as it is discharged from the pump discharge 35.

The use of the power recovery pump turbine greatly reduces the pressure increase in the saltwater required to be produced by the feed pump 9 and this significantly reduced the power requirements for the feed pump. Reducing the power requirement for the feed pump has a significant impact on the energy cost for operating the feed pump 9. At the same time the reduced feed pump discharge pressure reduces the stress on the pump and should extend the life of the feed pump. In addition, the concentrated saltwater brine that is discharged through the turbine exhaust passage 43 is at a very low or zero pressure so that the concentrated saltwater brine can be easily disposed of. This eliminates the need for a throttle valve to reduce the pressure of the concentrated saltwater brine that is discharged from the membrane chamber 11.

For the power recovery pump turbine to work effectively several significant problems must be overcome. At the pump inlet 33 the saltwater is delivered at a very high pressure (about 600 psi) from the feed pump 9. This high pressure generates a strong axial force on the components inside of the power recovery pump turbine. This high axial force must be accomodated through a simple reliable and low cost thrust bearing for the rotor shaft 61. This thrust bearing must display low drag characteristics and cannot require lubrication as the lubricants could contaminate the water passing to the membrane chamber 11. The power recovery pump turbine must also be able to transfer a significant portion of the hydraulic energy available in the concentrated brine reject stream from the membrane chamber 11 to justify the cost of the power recovery pump turbine. Unfortunately, the combination of high pressure differentials and low flow rates found in most reverse osmosis system are conditions that are very unfavorable for good efficiency in turbo machinery. The only way to obtain good turbine efficiency is to have very high rotational speeds for the turbine impeller and this causes problems with the bearings for the rotor shaft. The power recovery pump turbine must also be able to operate for several years with little or no maintenance. Most reverse osmosis systems are used in applications where very little maintenance service is available. Thus the power recovery pump turbine component of the reverse osmosis system must require very little maintenance. In order to maintain good efficiency for the power recovery pump turbine it is necessary to have very close tolerances between the internal seals and these close tolerances must be maintained during the operation of the power recovery pump turbine. Due to the conditions in which reverse osmosis system operate, it is inevitable that wear and corrosion will take place on the components of the power recovery pump turbine. Accordingly, it is necessary to have an automatic system to adjust the seal clearances to accomodate the wear and corrosion in the power recovery pump turbine.

As set forth above, the pressure at the pump inlet 33 is approximately 600 psi and the pressure at the turbine exhaust passageway is essentially zero. This large pressure differential acts to push the rotor shaft 61 and the attached pump impeller 57 and turbine impeller 59 towards the turbine exhaust passage 43. The force acting on the rotor shaft 61 and the pump impeller 57 and the turbine impeller 59 can exceed 500 pounds.

Conventional thrust bearings are not suited to handle the loads that can be placed upon the rotor shaft 61 of the power recovery pump turbine. Rolling contact thrust bearings such as ball or roller bearings must operate with proper lubrication such as oil or grease. Such bearings require two or more shaft seals that are able to separate the high pressure water from the bearing. The shaft seals would be very expensive, require high maintenance and always create the possibility of contamination of the saltwater with lubricants. A water lubricated fluid film thrust bearing is another possibility. However, in order for a water lubricated fluid film thrust bearing to function, the shaft located in the bearing must revolve at very high rates of speed in order to establish the lubricating film of water between the rotating and stationary thrust surfaces. In a power recovery pump turbine the axial thrust can be present when the rotor is revolving very slowly or is completely stationary. For example, during the start-up of the system the feed pump will quickly develop its full pressure yet the rotor shaft and impellers in the power recovery pump turbine will not begin to rotate until the saltwater brine reject from the membrane chamber 11 is directed to the turbine inlet nozzle 41 to cause the turbine impeller 59 to rotate. The rotor shaft 61, turbine impeller 59 and pump impeller 57 will rotate slowly at the start-up due to rotor inertia. Thus, in the power recovery pump turbine a fluid film thrust bearing would not be able to handle the axial thrust loads encountered during portions of the operational cycle for the power recovery pump turbine.

To handle the axial loads a thrust balancing technique is used by the power recovery pump turbine. A groove 67 is located in the turbine end cap 53. A passageway 69 extends through the turbine end cap 53. The groove 67 is in communication with the turbine impeller cavity 83. A passageway 73 extends through the pump end cap 51 as in communication with the pump inlet 33. A conduit 75 extends from the passageway 69 in the turbine end cap 53 to the passageway 73 of the pump end cap 51. The internal surface of the turbine end cap is machined to precisely the same contour as the side wall of the turbine impeller 59. When the feed pump is operating, the fluid pressure in the pump inlet 33 is somewhat higher than in the turbine impeller cavity 83. This pressure differential can cause the rotor shaft 61, the pump impeller 57 and the turbine impeller 59 to move in a direction towards the turbine end cap 53. When this occurs the outer axial clearance 85 and inner axial clearance 87 between the turbine impeller 59 and the turbine end cap 53 is reduced resulting in an effective sealing of the groove 67 from the turbine impeller cavity 83 and the turbine exhaust passageway 43. This sealing effect combined with the flow of liquid through conduit 75 causes the fluid pressure in the groove 67 to buildup and this prevents any further movement of the rotor shaft 61 towards the turbine end cap 53. If the rotor shaft 61 moves away from the turbine end cap 53, there is an increase in the outer axial clearance 85 and inner axial clearance 87, and this allows the water supply to the groove 67 to drain out quickly through the axial clearance into the turbine exhaust passageway 43. This drainage reduces the pressure in the groove 67 and reduces the force acting on the rotor shaft to move the rotor shaft away from the turbine end cap 53. Usually when the saltwater rapidly drains out of the groove 67 there is a tendency for the rotor shaft 61 to move back towards the turbine end cap 53. The orifice plate 79 helps to further reduce the pressure in the groove 67 during period of high drainage as the orifice plate restricts the quick change of flow conditions in the conduit 75. Thus, there can not be a drastic increase in the flow rate of saltwater through the conduit 75 into the groove 67.

This connection by the groove 67, the passageway 73 and conduit 75 between the turbine impeller cavity 83 and the pump inlet 33 insures that there is never contact between the turbine end cap 53 and the turbine impeller 59 even during transient conditions such as start-up of the power recovery pump turbine. Also, any wear that may occur due to such factors as corrosion or errosion simply results in the rotor shaft moving axially toward the turbine end cap 53 by a distance sufficient to compensate for the material that has been lost from the turbine end cap 53 or the turbine impeller 59 due to the effects of corrosion or errosion. Therefore, the thrust balancing features of the power recovery pump turbine should last almost indefinitely and insure that the rotor shaft 61, the turbine impeller 59 and the pump impeller 57 are in the proper position. This thrust balancing technique also eliminates the need for wear rings for the turbine impeller cavity 83. Normally wear rings are used to minimize the leakage between the high pressure in the turbine impeller cavity 83 and the relatively low pressure in the turbine exhaust passageway 43. The extremely small axial clearance 85 between the turbine impeller cavity 83 and the turbine exhaust passageway 43 provides an effective seal and does away with the requirement for wear rings.

Figure 10:
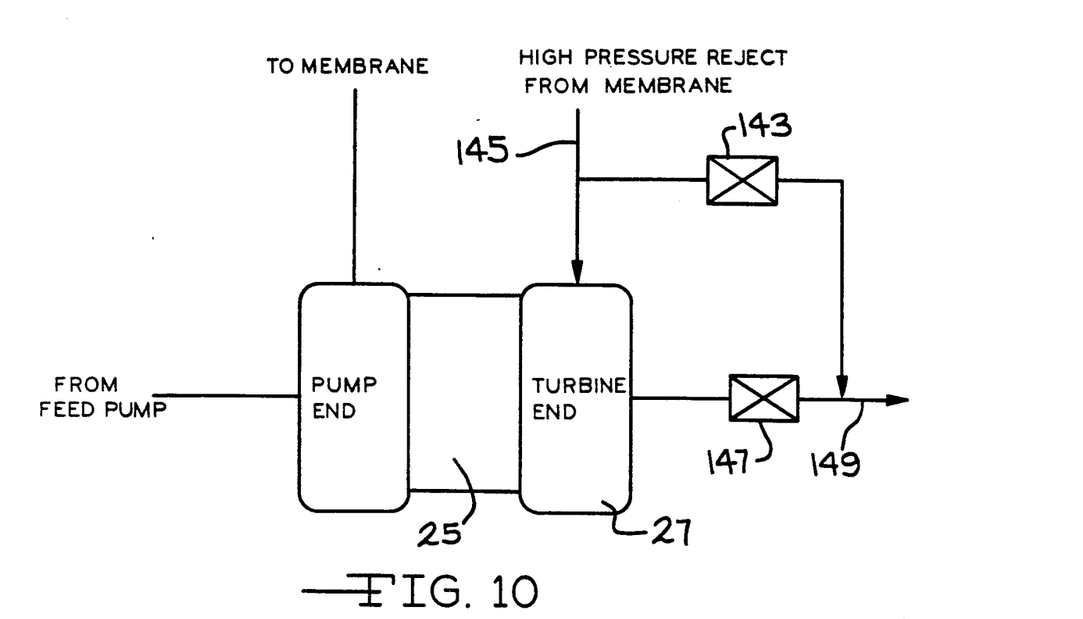
FIG. 10 is another embodiment of the present invention.

The power recovery pump turbine 25 is constructed to insure adequate lubrication and cooling of the sleeve bearing 63 (as shown in FIG. 10). The pressure in the chamber 111 which is on the pump side of the sleeve bearing 63 is somewhat higher than the pressure in the annular space 113 which is on the turbine side of the sleeve bearing. This pressure differential results in the flow of liquid from the chamber 111, through the seal clearance 115 into the annular space 113. This flow of liquid helps to provide adequate fluid film to lubricate the bearing and also insures that frictionally generated heat is carried away from the sleeve bearing 63. At the same time the small seal clearance 115 effectively minimizes excessive leakage between the chamber 111 and the annular space 113. Thus the arrangement shown in FIG. 10 for the rotor shaft 61 and sleeve bearing 63 provides for bearing lubrication, bearing cooling and shaft sealing in a very simple manner.

In FIG. 5 there is shown the seal that provides a long-lasting and effective seal between the pump impeller discharge and the pump inlet. A wear ring 93 extends part way into the seal cavity 91 in the pump end cap 51. The seal cavity 91 is sealed by O-rings 95 that engage the wear ring 93. The wear ring 93 is free to move axially in the seal cavity 91. The pin 92 prevents rotation of the wearing ring 93 in the seal cavity 91. The seal cavity 91 is in communication with the pump inlet 33 through passageway 97. In operation the pump impeller cavity 88 becomes filled with fluid that is at a somewhat higher pressure than the fluid in the pump inlet 33. The average pressure acting on the seal face 103 is about halfway between the pressure in the pump impeller cavity 88 and the pump inlet 33. The net force acting to push the seal face 103 away from the side wall of the pump impeller 57 equals the average pressure times the area of the seal face 103. The force acting to push the seal face 103 towards the side wall of the pump impeller 57 equals the sum of the area of the face 101 in the seal cavity 91 times the suction pressure of the pump and the area of the step face 105 times the pressure in the pump impeller cavity 88. With the proper ratio between the step face 105 and the face 101, the axial seal clearance between the seal face 103 and the side wall of the impeller 57 can be maintained as less than 0.005 inches. This close clearance reduces the leakage from the impeller cavity 88 to the pump inlet 33 to a negligible value.

In reverse osmosis systems, the flow rate into and out of the membrane chamber can change due to the changes in the demand for fresh water. The power recovery pump turbine rotor speed automatically increases or decreases to meet minor changes in the flow rate. FIG. 10 illustrates the use of two valves to handle extremely large changes in the flow rate into and out of the membrane chamber. The first valve 143 is attached to the brine discharge line 145 between the power recovery pump turbine 25 and the membrane chamber (not shown). If the pressure in the membrane chamber becomes too high due to increased flow of the concentrated saltwater brine from the membrane chamber, the first valve 143 will open. A second valve 147 is positioned on the disposal line 149 that extends from the turbine end 27 of the power recovery pump turbine 25. The second valve 147 restricts turbine outlet flow if the pressure in the membrane chamber becomes too low due to reduced flow of the concentrated saltwater brine that is discharged from the membrane chamber. The first valve 143 and second valve 147 may be manually or automatically operated.

Figure 11:
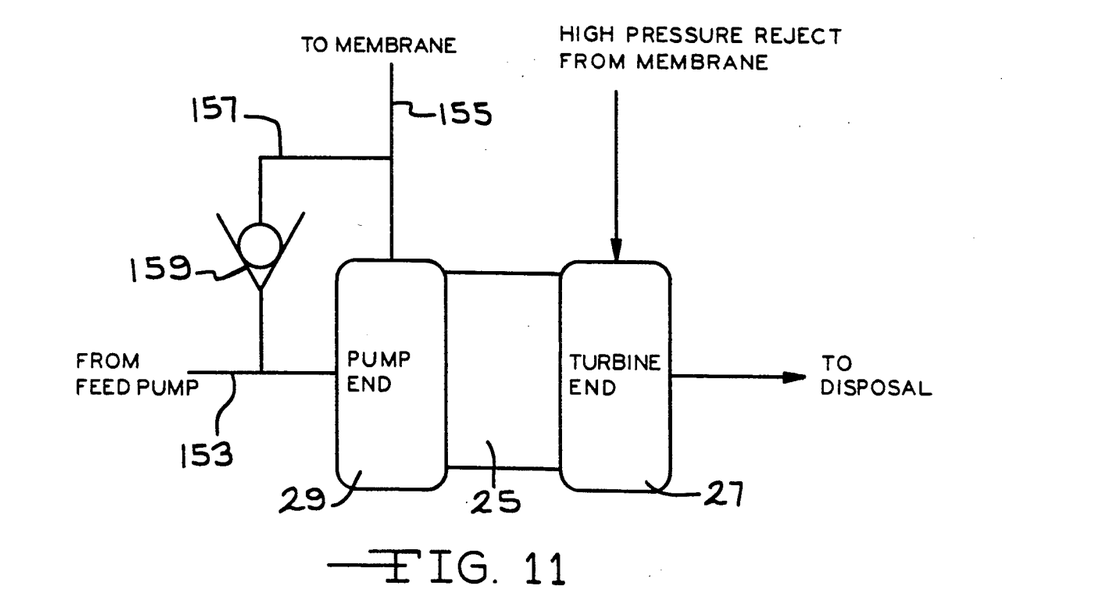
FIG. 11 is another embodiment of the present invention.

In some applications it is possible that the concentrated saltwater brine flow rate from the membrane chamber is insufficient to operate the power recovery pump turbine in a normal manner. In such cases the turbine end of the power recovery pump turbine does not rotate rapidly enough to provide force to the pump end of the power recovery pump turbine to assist in pumping the salt water to the member chamber. In this situation the power recovery pump turbine can actually reduce feed pressure through the membrane chamber and thereby increase the amount of work required by the feed pump. In this situation the power recovery pump turbine could be a liability to the system rather than act to reduce energy costs. FIG. 11 shows a configuration for the power recovery pump turbine that can act to reduce the pressure of the saltwater that is fed from the feed pump to the membrane chamber. In this configuration a pipe 153 directs the saltwater from the feed pump to the pump end 29 of the power recovery pump turbine 25. Feed pipe 155 directs the saltwater from the pump end 29 of the power recovery pump turbine 25 to the membrane chamber (not shown). A passageway 157 extends between the pipe 153 and the feed pipe 155 to provide an alternative path for the flow of saltwater that bypasses the power recovery pump turbine. A check valve 159 is positioned in the passageway 157. During normal operation of the power recovery pump turbine, the pressure is higher in the feed pipe 155 that discharges from the pump end 29 than in the pipe 153 that supplies saltwater to the pump inlet. In this situation the higher pressure in the feed line pipe 155 will act upon the check valve 159 and keep the check valve closed so that saltwater will not flow from the pipe 153 through the passageway 157. However, in those instances where the pressure in the pipe 153 is higher than the pressure in the feed pipe 155 due to insufficient flow of concentrated saltwater brine through the turbine end 127 of the power recovery pump turbine 25, the check valve 159 will open due to the higher pressure in pipe 153. This provides an alternative flow path for the saltwater through the passageway 157 to avoid the power recovery pump turbine. The passageway 157 and check valve 159 provide a system whereby any undesireable pressure loss in the stream of saltwater that is fed to the membrane chamber can be significantly reduced or eliminated.

Figure 3:
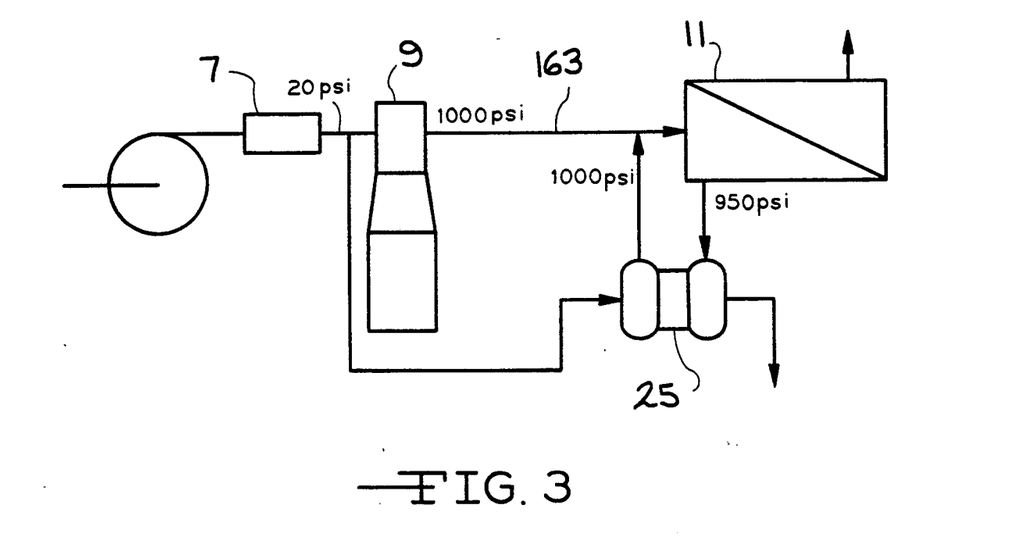
FIG. 3 is another embodiment of the present invention.

FIG. 3 shows an alternative embodiment where a power recovery turbine pump 25 is pumping in parallel with the feed pump 9. The saltwater leaving the filter unit 7 is split into two streams. One stream passes through the feed pump 9 which raises the water pressure to the level required by the membrane chamber 11. The other stream of saltwater passes through the power recovery turbine pump 25 which also raises the water pressure to the level required by the membrane chamber 11. The streams of saltwater discharge from the feed pump 9 and from the power recovery pump turbine 25 are combined into a single stream just prior to entering the membrane chamber 11. The high pressure concentrated saltwater brine that is discharged from the membrane chamber 11 is directed into the power recovery pump turbine 25 as discussed previously. Using the feed pump 9 and power recovery pump turbine 25 to pump in parallel allows the use of a lower capacity feed pump as the feed pump only handles a portion of the total feed flow that is supplied to the membrane chamber 11. This reduced flow rate also reduces the power required by the feed pump 9. Another advantage is that if the power recovery pump turbine should fail or be removed from the reverse osmosis system, the feed pump could still provide a significant quantity of saltwater into the membrane chamber 11 at an adequate pressure to produce fresh water.

Figure 4:
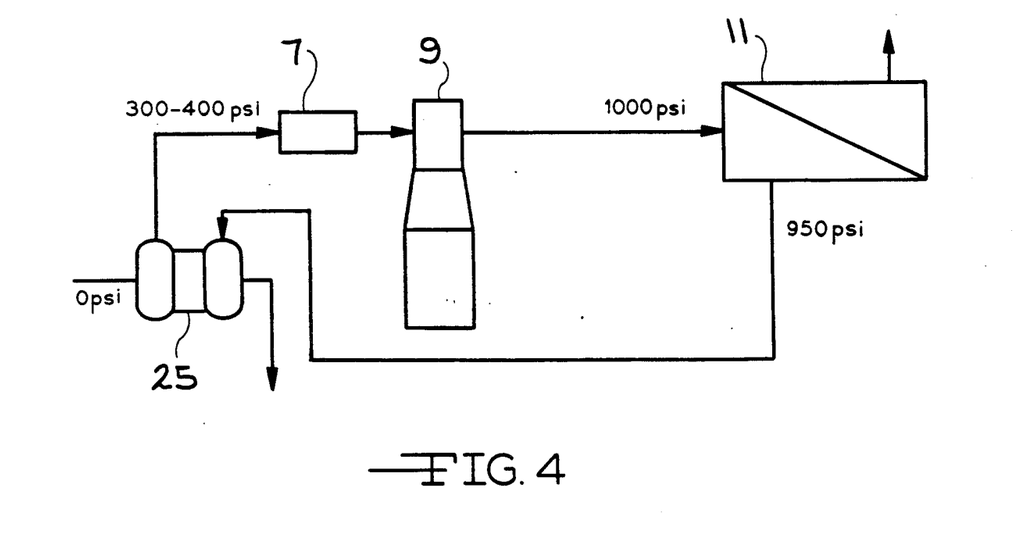
FIG. 4 is another embodiment of the present invention.

Another alternative embodiment that can be used in reverse osmosis system is shown in FIG. 4. In this embodiment the power recovery pump turbine 25 is positioned ahead of the feed pump 9 and filter 7. In this configuration the power recovery pump turbine eliminates the booster pump shown in FIG. 2. In this configuration the power recovery pump turbine acts as previously described to increase the pressure of the saltwater that is to be purified. However, in this embodiment the pressure is increased before the saltwater passes through the filter and is fed into the feed pump 9. However, the same general benefits are derived as the feed pump 9 does not have to provide as much of an increase in the pressure of the saltwater and this greatly reduces the power requirements for the feed pump and can extend the life of the feed pump. At the same time, energy is recovered from the high pressure concentrated saltwater brine that is discharged from the membrane chamber 11. This energy is effectively recaptured and utilized by the power recovery pump turbine 25 to produce the overall energy requirements of the reverse osmosis system.

The above description of the invention is given for the sake of explanation. Various modifications and substitutions, other than those cited, can be made without departing from the scope of the invention as defined by the following claims.

We claim:

1. An energy recovery pump turbine for use in industrial processes where a fluid is pumped at a high pressure into the process and at least a portion of the fluid is discharged from the process at a high pressure, the turbine pump comprising:
   a central body portion that defines a turbine impeller cavity and a pump impeller cavity;
   a turbine inlet nozzle extending from said turbine impeller cavity through said central body portion; said turbine inlet nozzle being located adjacent said outer periphery of said turbine impeller cavity, a turbine exhaust passageway passing into said turbine impeller cavity, said turbine exhaust passageway being located adjacent said center of said turbine impeller;
   a turbine positioned in said turbine impeller cavity to receive the high pressure fluid discharged from said process, said turbine having an impeller positioned on a shaft, said fluid engaging said impeller and causing said impeller and shaft to rotate;
   a pump positioned in said pump impeller cavity adjacent to said turbine to receive said fluid being pumped to said process, said pump having an impeller mounted on a shaft, said shaft of said pump being operatively connected to said shaft of said turbine, said rotation of said turbine shaft causing said impeller and shaft of said pump to rotate whereby said pump assists in supplying said fluid under high pressure to said process and to recover energy from said high pressure fluid discharge from said process;
   an annular groove positioned in said turbine impeller cavity said groove in said turbine impeller cavity being in communication with a high fluid pressure region in said pump turbine and fluid can flow through said groove to balance forces exerted on said pump impeller and said turbine impeller; and
   a feed pump for supplying said fluid at high pressure to said process, said turbine pump being operatively connected to a supply line extending from said feed pump to said process, said fluid under pressure from said feed pump being directed to said pump of said turbine pump where said rotating impeller of said pump increases the pressure of said fluid that is pumped to said process.

2. The pump turbine of claim 1 wherein said impeller of said turbine and said impeller of said pump are mounted on a common shaft.

3. The pump turbine of claim 1 wherein the fluid discharged from said process enters said turbine through a turbine nozzle that converts the high pressure fluid into a high velocity flow to rotate said turbine impeller.

4. The pump turbine of claim 1 wherein a pump end cap is positioned on said central body portion to close said pump impeller cavity and a turbine end cap is positioned on said central body portion to close said turbine impeller cavity.

5. The pump turbine of claim 4 wherein a pump inlet passes through said pump end cap into said pump impeller cavity and a pump discharge extends from said pump impeller cavity through said central body portion, said pump inlet located adjacent said center of said pump impeller and said pump discharge located adjacent said outer periphery of said pump impeller cavity.

6. The pump turbine of claim 5 wherein said turbine exhaust passageway passes through said turbine end cap into said turbine impeller cavity.

7. The pump turbine of claim 6 wherein said annular groove is positioned in said face of said turbine end cap that faces said turbine impeller cavity, a passageway extendin through said turbine end cap and being in communication with said groove, a channel extending from said pump inlet through said pump end cap, a conduit extending from said channel in said pump end cap to said passageway in said turbine end cap whereby said groove in said turbine end cap is in communication with said pump inlet and fluid can flow through said conduit to balance forces exerted on said pump impeller and said turbine impeller.

8. The pump turbine of claim 7 wherein an orifice plate is positioned in said conduit that extends from said channel in said pump end cap to said passageway in said turbine end cap, said orifice plate having a plurality of orifices through which fluid in said conduit must flow whereby said orifice plate prevents quick changes in the rate of fluid flow through said conduit.

9. The pump turbine of claim 4 wherein a seal cavity is positioned in said pump end cap, a wear ring is slideably positioned in said seal cavity with a portion of said wear ring extending from said cavity and terminating in a seal face that is disposed adjacent said pump impeller.

10. The pump turbine of claim 9 wherein a bore extends through said pump end cap and connects said seal cavity with said pump inlet whereby fluid in said pump inlet is in communication with said seal cavity to balance the forces on said wear ring.

11. The pump turbine of claim 10 wherein said portion of said wear ring extending from said seal cavity has a cross-sectional area that is larger than the cross-sectional area of the portion of said wear ring positioned in said seal cavity.

12. The pump turbine of claim 11 wherein a shoulder is present on said wear ring between said portion of said wear ring that extends into said seal cavity and said portion of said wear ring that extends from said cavity, said shoulder forming a step face that is substantially parallel to said seal face on said wear ring.

13. The pump turbine of claim 12 wherein said portion of said wear ring that extends into said seal cavity terminates in a face, said face of said wear ring having a cross-sectional area that is approximately 0.4 of the cross-sectional area of said seal face, said step face on said wear ring having a cross-sectional area that is approximately 0.6 of the cross-sectional area of said seal face whereby said relationship between said cross-sectional areas of said face, seal face and step face on said wear ring and said bore that places said seal cavity in communication with said pump inlet acts to balance said forces on said moveable wear ring to position said seal face in the desired position adjacent said pump impeller.

14. The pump turbine of claim 1 wherein said annular groove has a cross-sectional area this is about 1.5 to about 2.5 times the cross-sectional area of said shaft to balance said forces on said pump and turbine impellers.

15. The pump turbine of claim 1 wherein a sleeve bearing is positioned in said central body portion for rotatably supporting said shaft upon which said pump and turbine impellers are mounted, a chamber being positioned between said sleeve bearing and the pump impeller cavity, said chamber being in communication with said pump impeller cavity, an annular space positioned on the side of said sleeve bearing opposite to said chamber, said annular space being in communication with said turbine impeller cavity, a small seal clearance being present between said sleeve bearing and said shaft, said fluid in said chamber being at a higher pressure than said fluid in said annular space whereby fluid from said pump impeller flows to said chamber through said small seal clearance, into said annular space and into said turbine impeller cavity, said flow of fluid helping to provide a fluid film to lubricate said sleeve bearing and to carry away frictionally generated heat from said sleeve bearing.

16. An energy recovery pump turbine for use in an industrial process where a liquid is pumped at a high pressure into the process and at least a portion of the liquid is discharged from the process at a high pressure, the turbine pump comprising:

a central body portion that defines a turbine impeller cavity and a pump impeller cavity;

a pump end cap positioned on said central body portion to close said pump impeller cavity and a turbine end cap positioned on said central body portion to close said turbine impeller cavity;

a pump inlet passing through said pump end cap into said pump impeller cavity and a pump discharge extending from said pump impeller cavity through said central body portion; said pump inlet being located adjacent said center of said pump impeller and said pump discharge being located adjacent said outer periphery of said pump impeller cavity;

a turbine inlet nozzle extending from said turbine impeller cavity through said central body portion, said turbine inlet nozzle being located adjacent said outer periphery of said turbine impeller cavity, a turbine exhaust passageway passing through said turbine end cap into said turbine impeller cavity, said turbine exhaust passageway being located adjacent said center of said turbine impeller;

a turbine impeller positioned in said turbine impeller cavity, said turbine impeller being mounted on a shaft, said turbine impeller cavity being disposed to receive high pressure liquid discharged from said process to cause said turbine impeller to rotate;

a pump impeller positioned in said pump impeller cavity, said pump impeller being mounted on said shaft upon which said turbine impeller is mounted, said pump impeller cavity having an inlet that is disposed to receive said liquid being pumped to said process, said rotation of said turbine impeller causing said shaft and said pump impeller to rotate whereby said pump assists in supplying said liquid under high pressure to said process and to recover energy from said high pressure liquid discharged from said process;

an annular groove positioned in said side wall of said turbine impeller cavity adjacent said turbine impeller, said annular groove being positioned in said face of said turbine end cap that faces said turbine impeller cavity;

a passageway extending through said turbine end cap and being in communication with said groove;

a channel extending from said pump inlet through said pump end cap;

a conduit extending from said channel to said passageway whereby said annular groove is in communication with said pump inlet and fluid can flow through said conduit to balance forces exerted on said pump impeller and said turbine impeller; and a feed pump for supplying said fluid at high pressure to said process, said turbine pump being operatively connected to said supplyline extending from said feed pump to said process, said fluid under pressure from said feed pump being directed to said pump of said turbine pump where said rotating impeller increases the pressure of said fluid that is pumped to said process.

17. The pump turbine of claim 16 wherein the fluid discharged from said process enters said turbine through a turbine nozzle located in the outer periphery of said turbine impeller cavity, said turbine nozzle converting said high pressure fluid into a high velocity flow to rotate said turbine impeller.

18. The pump turbine of claim 16 wherein said annular groove has a cross-sectional area this is about 1.5 to about 2.5 times the cross-sectional area of said shaft to balance said forces on said pump and turbine impellers.

19. The pump turbine of claim 16 wherein a seal cavity is positioned in said pump end cap, a wear ring is slideably positioned in said seal cavity with a portion of said wear ring extending from said cavity and terminating in a seal face that is disposed adjacent said pump impeller.

20. The pump turbine of claim 19 wherein a bore extends through said pump end cap and connects said seal cavity with said pump inlet whereby fluid in said pump inlet is in communication with said seal cavity to balance the forces on said wear ring.

21. The pump turbine of claim 20 wherein said portion of said wear ring extending from said seal cavity has a cross-sectional area that is larger than the cross-sectional area of the portion of said wear ring positioned in said seal cavity.

22. The pump turbine of claim 21 wherein a shoulder is present on said wear ring between said portion of said wear ring that extends into said seal cavity and said portion of said wear ring that extends from said cavity, said shoulder forming a step face that is substantially parallel to said seal face on said wear ring.

23. The pump turbine of claim 22 wherein said portion of said wear ring that extends into said seal cavity terminates in a face, said face of said wear ring having a cross-sectional area that is approximately 0.4 of the cross-sectional area of said seal face, said step face on said wear ring having a cross-sectional area that is approximately 0.6 of the cross-sectional area of said seal face whereby said relationship between said cross-sectional areas of said face, seal face and step face on said wear ring and said bore that places said seal cavity in communication with said pump inlet acts to balance said forces on said moveable wear ring to position said seal face in the desired position adjacent said pump impeller.

24. A method for recovering energy from an industrial process where a fluid is pumped at a high pressure into said process and at least a portion of said fluid is discharged from said process at a high pressure, said method comprising:
  directing said high pressure discharge fluid to the inlet of a turbine, said inlet being located adjacent said outer periphery of said turbine;
  rotating an impeller of said turbine with said high pressure discharge fluid, said turbine impeller being mounted on a rotatable shaft, said high pressure discharge fluid being discharged from said turbine at a point adjacent the center of said turbine impeller;
  rotating an impeller in a pump that is mounted on said shaft, said pump impeller being rotated by said rotation of said shaft caused by said rotation of said turbine impeller;
  directing said fluid to be pumped to said process to the inlet of said pump whereby said rotating pump impeller assists in supplying fluid under high pressure to said process and to recover energy from said high pressure fluid discharged from said process; and,
  directing fluid from a high pressure region in said pump turbine to a conduit, said conduit being connected to an annular groove positioned in said turbine impeller cavity of said turbine, said annular groove being positioned adjacent said turbine impeller whereby fluid can flow through said conduit to said annular groove to balance fluid forces on said turbine and pump impellers.

25. The method of claim 24 in which a turbine nozzle is positioned in the outer periphery of said turbine, said turbine nozzle converting said high pressure fluid into a high velocity flow to rotate said turbine impeller.

26. The method of claim 24 in which a wear ring is slideably positioned in a seal cavity in said pump, a bore extending from said seal cavity to said pump inlet whereby fluid in said seal cavity and said pump impeller cavity act on said wear ring to balance the fluid forces on said wear ring and to maintain said seal face of said wear ring adjacent said pump impeller.

27. The method of claim 24 in which an orifice plate having a plurality of orifices is positioned in said conduit connecting said annular groove and said pump inlet, said orifice plate controlling the flow of fluid through said conduit to reduce sudden changes in the fluid flow to said annular groove.

28. The method of claim 24 in which a sleeve bearing is used to support said rotatable shaft, said sleeve bearing being in communication with said pump impeller cavity on one side and said turbine impeller cavity on said other side, said fluid in said pump impeller cavity being at a higher pressure than said fluid in said turbine impeller cavity whereby said fluid flows from said pump impeller cavity, through said seal clearance and into said turbine impeller cavity, said flow of fluid helping to provide a fluid film to lubricate said sleeve bearing and to carry away heat from said sleeve bearing.

29. An energy recovery system for use in an industrial process where a fluid is pumped at a high pressure into a chamber and at least a portion of the fluid is discharged from the chamber at a high pressure comprising:
  a feed pump to supply fluid under pressure to said chamber;
  a pump turbine having a central portion that defines a turbine impeller cavity and a pump impeller cavity;
  a turbine impeller positioned in said turbine impeller cavity, said turbine impeller being mounted on a shaft, said turbine impeller cavity being disposed to receive high pressure fluid discharged from said chamber to cause said turbine impeller to rotate, said inlet for said high pressure fluid being located adjacent said outer periphery of said turbine impeller cavity and said exhaust passageway for said high pressure fluid being located adjacent said center of said turbine impeller;
  a pump impeller positioned in said pump impeller cavity, said pump impeller being mounted on said shaft upon which said turbine impeller is mounted, said pump impeller cavity having an inlet that is disposed to receive said fluid from said feed pump that is being pumped to said chamber, said rotation of said turbine impeller causing said shaft and said pump impeller to rotate whereby said pump raises the pressure of said fluid supplied to said chamber and to recover energy from said high pressure liquid discharged from said process;

an annular groove positioned in said side wall of said turbine impeller cavity adjacent said turbine impeller;

a channel connected to a high fluid pressure region in said pump turbine; and, a conduit extending from said channel to said annular groove whereby said groove is in communication with said high fluid pressure region and fluid can flow through said conduit to balance forces exerted on said pump and turbine impellers.

30. The energy recovery system of claim 29, wherein a passageway is provided between said feed pump and said chamber, said passageway bypassing said pump impeller cavity, a check valve positioned in said passageway, said check valve being maintained in the closed position to close said passageway when the pressure of said fluid discharged from said pump impeller cavity is higher than the pressure of said fluid supplied to said pump impeller cavity by said feed pump, said check valve opening if the pressure of said fluid in said pump impeller discharge is less than the pressure of said fluid supplied to said pump impeller cavity whereby said fluid flows through said passageway and bypasses said pump impeller cavity to prevent said pump turbine from reducing the pressure of said fluid supplied to said chamber.

* * * * *